Aug. 21, 1928.
J. T. SIBLEY
1,681,649
IMPULSE ELECTRIC MOTOR
Filed Sept. 30, 1926    3 Sheets-Sheet 1
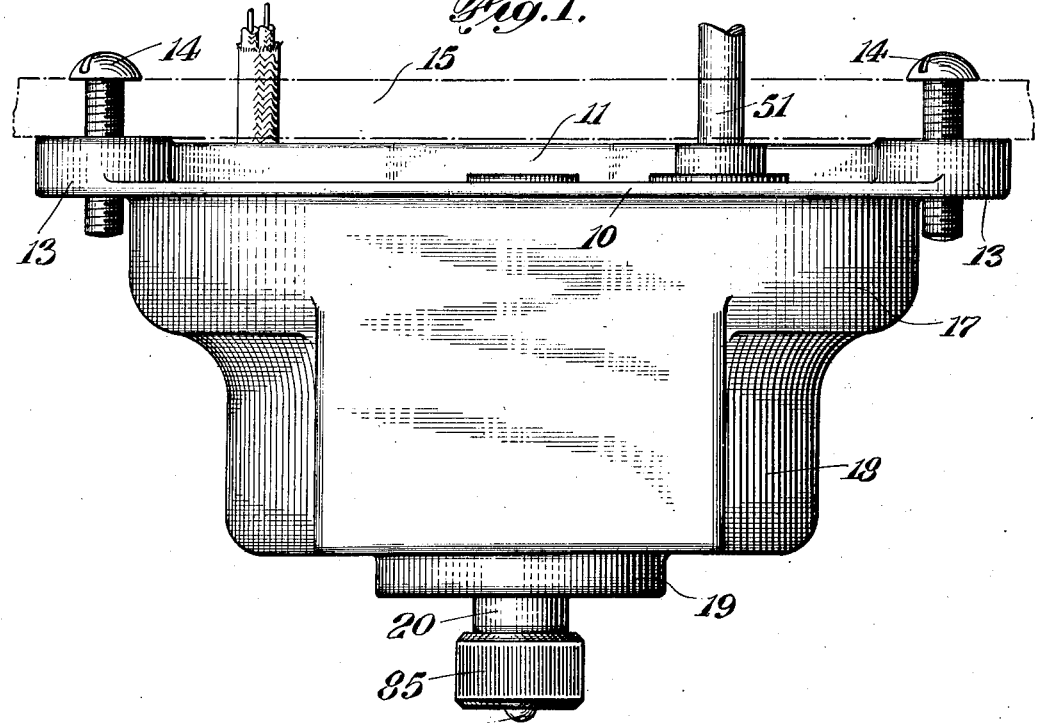
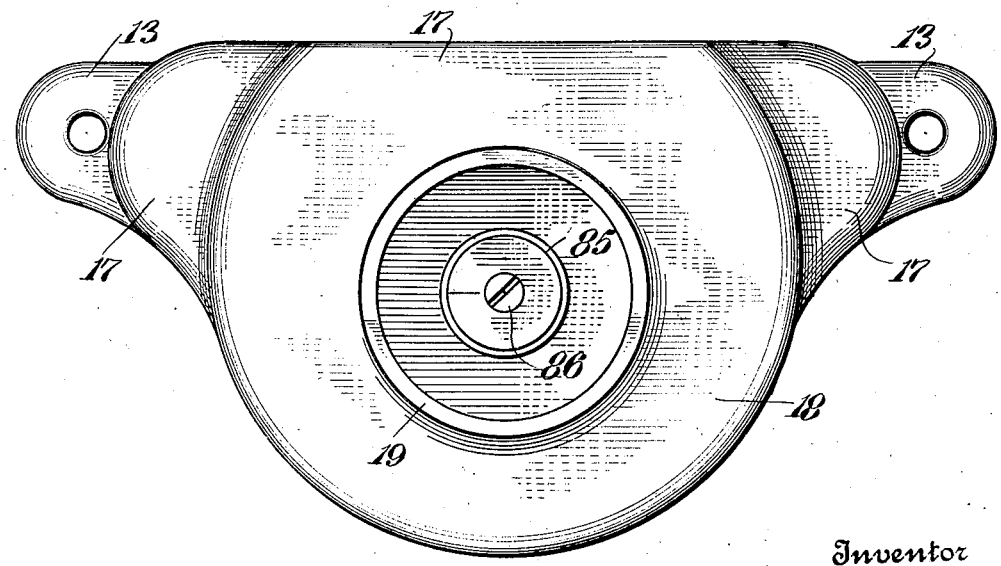
Inventor
James T. Sibley
By his Attorney
Ramsay Hoguet Aug. 21, 1928.
J. T. SIBLEY
1,681,649
IMPULSE ELECTRIC MOTOR
Filed Sept. 30, 1926   3 Sheets-Sheet 2
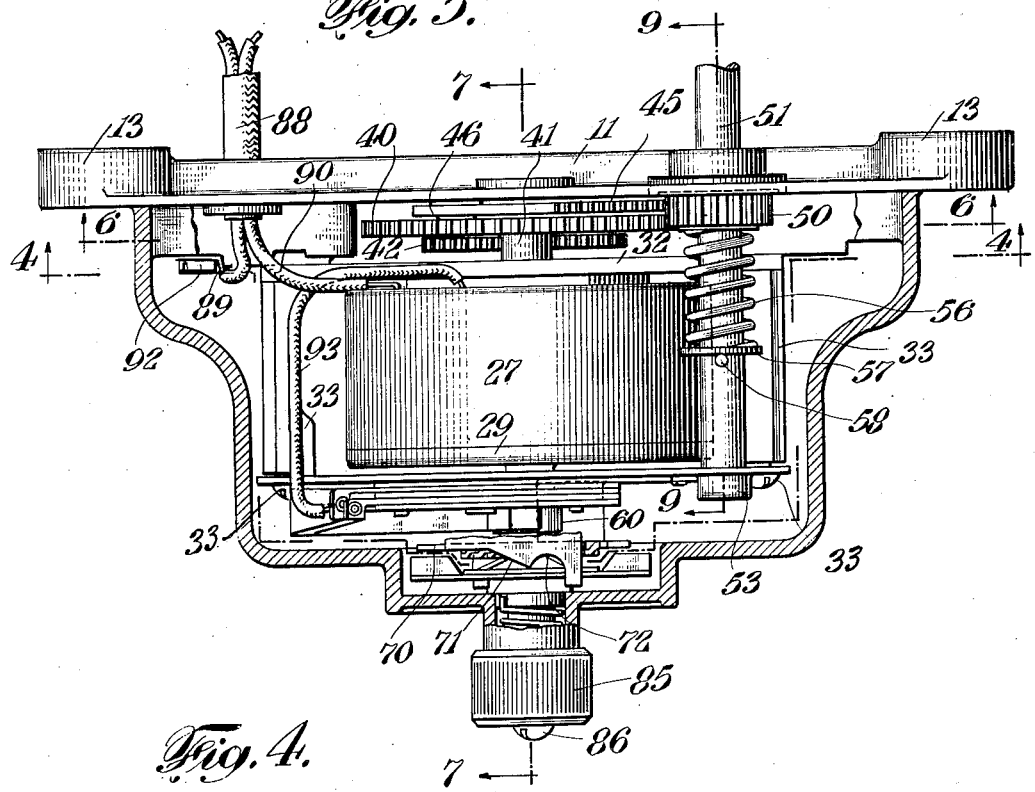
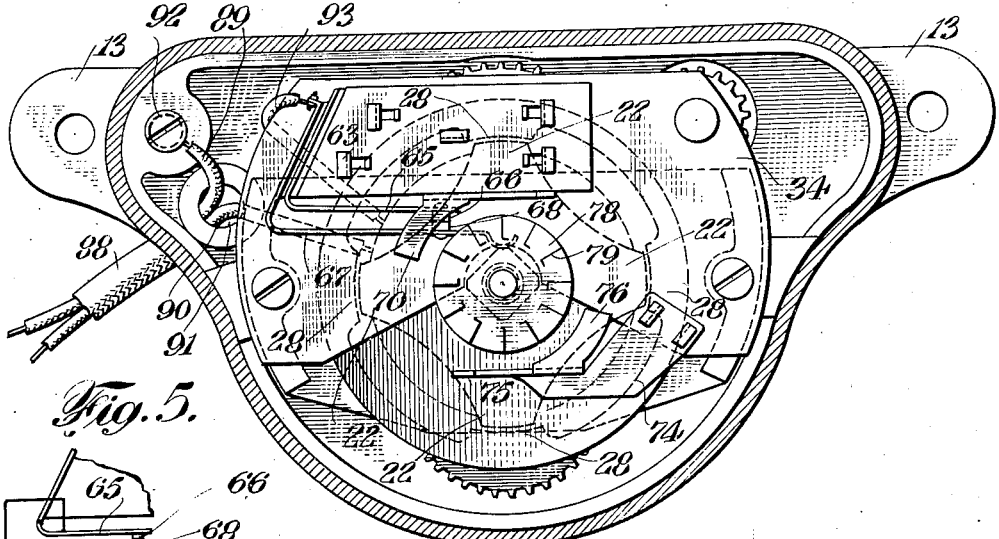
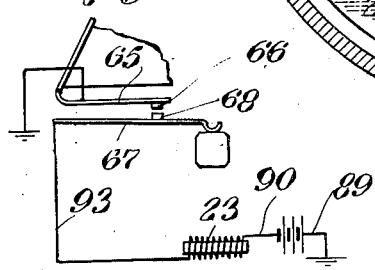
Inventor
James T. Sibley
By his Attorney
Ramsay Hoguet.

Aug. 21, 1928.  
J. T. SIBLEY  
1,681,649  
IMPULSE ELECTRIC MOTOR  
Filed Sept. 30, 1926   3 Sheets-Sheet 3
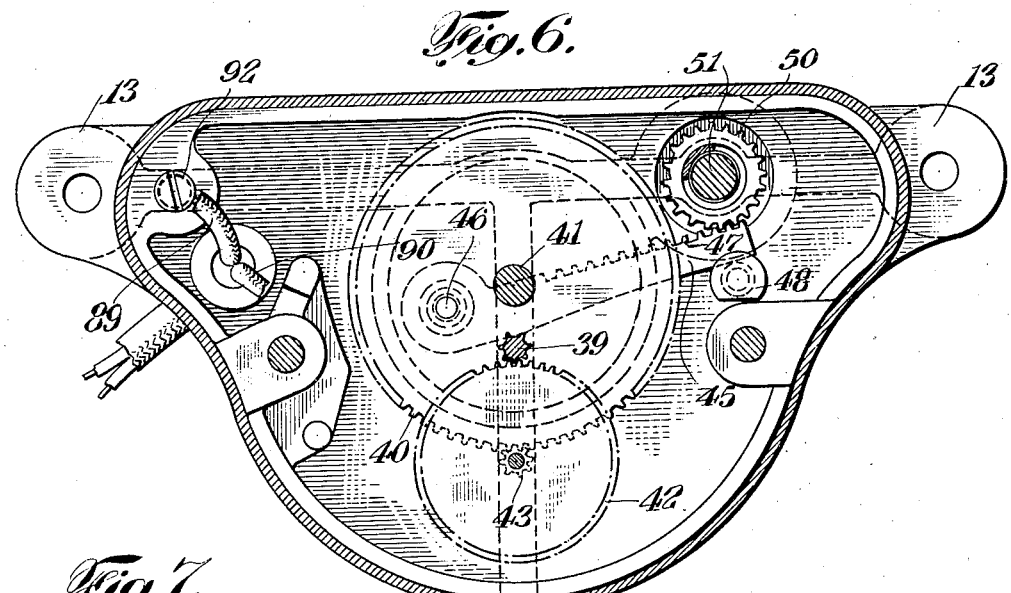
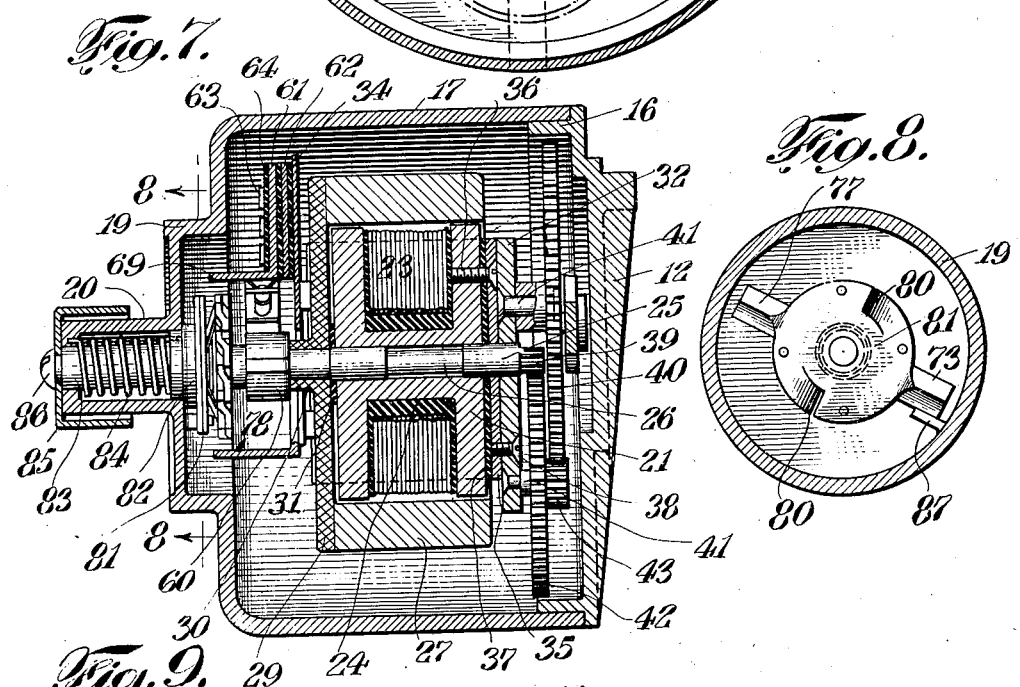
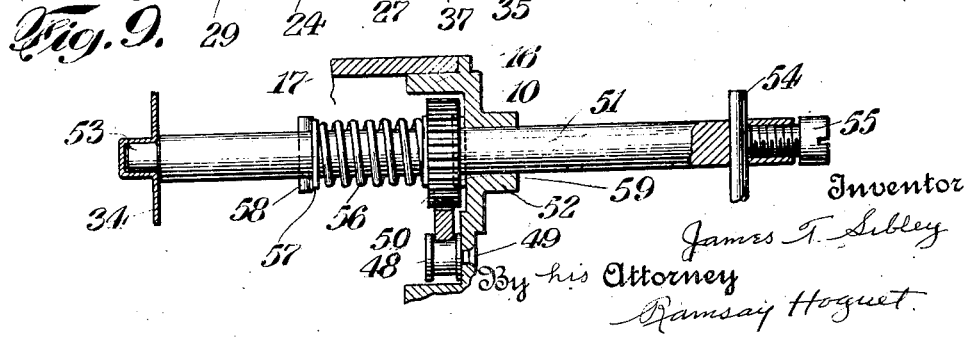
Inventor  
James T. Sibley  
By his Attorney  
Ramsay Hoguet Patented Aug. 21, 1928.

1,681,649

UNITED STATES PATENT OFFICE.

JAMES T. SIBLEY, OF NEW YORK, N. Y., ASSIGNOR TO S. & U. HOLDING COMPANY INC., OF NEW YORK, N. Y., A CORPORATION OF NEW YORK.

IMPULSE ELECTRIC MOTOR.

Application filed September 30, 1926. Serial No. 138,672.

The present invention relates to improvements in electric motors and more particularly in motors of the impulse type, in which a rotor is rotated by means of a field magnet and in which the circuit energization of the magnet is periodically interrupted by means of a circuit breaker.

The invention is designed to produce a small compact electric motor of the type named which is peculiarly adapted for use in operating a windshield wiper or the like, although of course capable of other uses. When used as a means for actuating the windshield wiper, it is desirable that the motor be as small, compact and light as possible, so that it may lie snugly against the windshield frame and to this end it is desirable that the motor be short in length so as to prevent its projecting to any extent and exerting a lever-age against the windshield.

The invention is therefore intended to produce a motor which will fulfill the above requirements and at the same time a motor which can be cheaply made, easily assembled and the parts maintained in rigid position.

The invention also contemplates the provision of a motor in which the field magnet serves as a bearing for the rotor shaft and as a support for a gear train and other transmitting parts.

The invention is further intended to produce a motor in which magnetic leakage and stray flux is reduced to a minimum, to which end the field magnet is made in the form of a bobbin with pole pieces projecting from its peripheries and the rotor is annular, extending around the bobbin and substantially enclosing the same, thus providing both an efficient construction and one which is very compact and short in length.

The invention further consists in the provision of a motor provided with a starter which serves both to impart an initial rotation to the rotor and at the same time to close the circuit, both results being obtained by a single, simple manipulation.

The invention is also intended to provide a driving connection between the wiper and the motor, which is both simple and effective and in which is embodied means for automatically disconnecting the motor from the wiper to protect it against overload.

With the above and other objects in view, the invention further resides in the details of constructions and arrangements of parts, hereinafter more specifically pointed out in the following detailed description of the accompanying drawings, in which Figure 1 is a plan view of a motor embodying the invention showing the same disposed in service position.

Figure 2 is an end view of the motor.

Figure 3 is a broken sectional plan view of the motor.

Figure 4 is a sectional elevational view taken on the line 4—4 of Figure 3.

Figure 5 is a diagrammatic view of the circuits employed.

Figure 6 is a sectional elevational view taken on the line 6—6 of Figure 3.

Figure 7 is a sectional view taken on the line 7—7 of Figure 3.

Figure 8 is a sectional view taken on the line 8—8 of Figure 7.

Figure 9 is a detail view showing the wiper shaft and driving connection to the same.

The construction disclosed consists of a casing having an end plate, 10, with a rib, 11, near the bottom and an inclined portion, 12, on the back for stiffening the same. The end plate is also provided with thickened feet, 13, through which extent screws or equivalent fastening means, 14, for attaching the motor to the wind shield, 15, of an automobile. The end plate, 10, has a projecting flange, 16, near its outer periphery on which the body portion, 17, of the casing is adapted to be placed and secured in some suitable manner. The body portion of the casing is reduced at 18, 19 and 20 so as to fit snugly around the inner parts of the motor and to provide a compact structure.

Within the casing the field magnet, 21, of the motor is disposed. This field magnet is in the form of a bobbin having a plurality of pole pieces 22, preferably four in number projecting from its peripheries as best shown in Figure 4. The field magnet has only a single coil, 23, which is mounted on insulation, 24, in the manner shown in Figure 7. By references to this figure it will be noted that the bobbin magnet serves as a bearing for the rotor shaft 25 which extends concentrically through the same. This rotor shaft has a reduced portion at 26, to provide for more perfect lubrication of the shaft. The rotor, 27, is annular in shape and extends around the periphery of the field magnet and substantially encloses the same. The pole pieces of the rotor are in the form of inwardly extending projections, 28. The rotor is secured to a non-magnetic disk, 29, which has an elongated bearing, 30, on the shaft, 25. An insulating washer, 31, is preferably inserted between the non-magnetic disk, 29, and the field magnet to space the same.

The field magnet of the rotor is rigidly attached to the end plate, 10, of the casing and to this end a non-magnetic plate, 32, is employed which is secured to the plate, 10, in parallel relation therewith. Attached to the plate, 32, are rearwardly-extending non-magnetic studs or posts, 33, to which another non-magnetic plate, 34, is clamped. This plate, 34, is parallel to plates 10 and 32 and as will appear below serves as a support for portions of the motor. To the end of the field magnet, a plate, 35, (see Figure 7) is attached by means of screws, 36, insulation, 37, being employed between the field magnet and the plate, 35, to prevent magnetic leakage from the field magnet. The plate, 35, is in turn attached as by screws, 38, to the supporting plate, 32. The field magnet is thus attached to and supported by the end plate, 10, of the casing.

The forward end of the rotor shaft, 25, is provided with a pinion, 39, which drives a large gear wheel, 40, mounted on a shaft, 41, attached to the plate, 32, the drive being through reducing gears 42, 43, supported on a shaft, 44, also attached to the plate, 32. The gear wheel, 40, drives a rack, 45, which has a crank connection at 46, with the outer face of the gear wheel. One edge of the rack is provided with teeth, 47, while the other edge is curved as shown in Figure 6, so that as the gear wheel, 40, is rotated by the motor, the rack is moved backwards and forwards between a guide wheel, 48, pivoted at 49, on the end plate, 10, of the motor casing as best shown in Figure 9 and a pinion, 50, which is loosely mounted on the wiper operating shaft, 51. The rack, 45, thus serves to oscillate the pinion, 50, and because of the curved portion on its back edge does not bind with the same as it is reciprocated.

The shaft, 51, is journaled in a thickened portion, 52, of the plate, 10, and in a socket, 53, of the back plate, 34. The projecting end of the shaft, 51, has a transverse rod, 54, which serves to operate a wiping element (not shown) and this rod is attached in place as by means of a screw, 55. The pinion, 50, which is loose upon the shaft, 51, as pointed out above, is urged longitudinally in one direction by a spring, 56, coiled around the shaft and abutting at this opposite end against the washer element, 57, held against longitudinal movement as by a transverse pin, 58, extending through the shaft, 51. One face of the pinion, 50, is grooved so as to be engaged by a transverse pin, 59, as shown in Figure 9, which pin is carried by the shaft, 51. Normally the movement of the rack, 45, will be transmitted to the shaft, 51, because of the engagement of the pinion, 50, with the pin, 59, but if the wiping operation offers too much resistance, the pinion will slip from engagement with the pin, 59, and will not transmit movement to the shaft, 51. Thus it will be seen that by this construction a slipping clutch is provided which serves to protect the motor against overload.

The rotor shaft, 25, which projects through the plate, 34, carries a multi-sided cam, 60, preferably having four sides to correspond to the number of pole pieces of the rotor and composed of fiber or other insulating material. This cam is designed to operate a switch which serves to periodically make and break the circuit through the coil of the field magnet. The circuit making and breaking means consists of two flat conductive strips, 61 and 62, adapted to be clamped snugly against the face of the plate, 34, as by means of lugs, 63, stuck up from the plate, 34, and having their free ends bent over or headed. The conductive strips are insulated from one another and from the plate, 34, by means of insulating strips, 64. Attached to the strip, 61, is a leaf spring, 65, having a contact point, 66, of tungsten or similar metal and attached to the strip, 62, is another leaf spring, 67, similar to the leaf spring, 65, and having a contact point, 68, adapted to cooperate with the contact point, 66. The springs are preferably integrally formed with the strips 61 and 62, and are bent into the desired shape. The free end of the spring, 67, bears against the multi-sided cam, 60, as best shown in Figure 4, so that contact between points, 66, and 68, and consequently circuit energizing of the magnet field is periodically made and broken as the cam rotates. As pointed out above the cam is of insulating material so that there is no possibility of short circuit through it. The conductive strip, 61, is also provided at its edge with an upturned flange, 69, having a right angular extending portion, 70, to serve as a part of the circuit closing means and this portion merges into an inclined part, 71, shown in Figure 3, which in turn merges into a seat 72, in which the contact arm, 73, (see Figure 8) of the starter seats. The plate, 34, has also attached thereto a strip, 74, having a flange, 75, with an angularly extending portion, 76, with which the arm, 77, disposed diametrically opposite the arm, 73, of the starter is adapted to engage. This latter arm is provided merely for the purpose of balancing and preventing distortion of the contact arm, 73.

On the rear end of the rotor shaft is a ratchet wheel, 78, having teeth, 79, radially disposed and struck up from its face. These teeth are adapted to be engaged by pawls, 80, of a starting disk, 81, carrying the arms, 73 and 77 which is held opposite the ratchet wheel, 78, and carried by the collar, 82, sliding on the starter shaft, 83. As shown in Figure 7, a spring, 84, is coiled around the strip, 83, one end connecting with the collar, 82, and the other end connecting with a part of the motor casing. A cap, 85, is secured rigidly to the starter shaft by a screw, 86, or the like.

It will be seen that the spring, 84, has a double function. It serves to force the disk, 81, forward so that the pawls, 80, may engage the teeth of the ratchet wheel, 78, and it serves also to bias the disk, 81, in such an angular position that normally the contact arm, 73, will lie against an abutment, 87, on the inner wall of the motor casing which position corresponds to the inoperative position of the motor.

The current is let into the machine through a cable, 88, as shown in Figure 4. The wires, 89, and 90, of the cable after passing through the opening, 91, in the casing divide, the wire, 89, connecting with the binding post, 92, on the inner part of the casing which serves as a ground connection, and the wire, 90, connecting to the field coil, 23. The return wire, 93, from the field coil connects with the spring, 67, so that when the contacts, 66 and 68, meet, the current will pass from contact 68, to the other contact 66, thence to the spring 65, plate, 61, the angular portion, 70, and through the starter to the starter shaft, 83, thence to the casing or ground. The circuit is shown in a general way in Figure 5.

Considering now the operation of the motor, the inoperative position of the starter is shown in Figure 8, in which position the arm, 73, bears against the abutment, 87, under the action of the spring, 84, and the circuit to the ground from the contact spring, 65, is broken. In order to start the motor, the operator turns the cap, 85, against the action of the spring, 84, and this movement causes the disk, 80, to turn also, so that an initial impulse is given to the rotor because of the engagement of the pawls, 80, with the teeth of the ratchet wheel, 78. As the turning continues the contact arm, 73, engages the members, 70 and 71, which provide a long smooth easy contact, and the circuit is closed through the contact arm, 73, the disk, 81, thence to the starter shaft, 83, and to the casing or ground. Continued rotation of the contact arm, 73, carries it into its seat, 72, where it is held against the tension of the spring, 84. The circuit is thus closed and the rotor started by the same motion, the rotor being practically up to normal speed at the very start, after which it functions as usual, the circuit being periodically made and broken by the action of the cam, 60, on the contact springs, 65, and 67. When the motor is to be stopped, the cap, 85, is turned back and the arm, 73, swings back to rest against the abutment, 87, thus breaking the circuit to the ground.

I claim:

1. An electric motor comprising a field magnet, a rotor therefor, a supporting plate associated with the field magnet, plates carried by the supporting plate and insulated therefrom and from each other, said plates being in the circuit of the field magnet, normally separated arms on said plates and carrying contacts, and a cam on the rotor shaft for intermittently closing the contacts.

2. An electric motor comprising a field magnet, a rotor therefor, a supporting plate associated with the field magnet, plates carried by the supporting plate and insulated therefrom and from each other, said plates being in the circuit of the field magnet, a rotary starter, and means carried by the starter and arranged to engage one of said plates to close the circuit of the field magnet.

3. An electric motor comprising a field magnet, a rotor therefor, and a starter for completing the circuit of the field magnet, said starter comprising a shaft, a conductive arm carried by the shaft, means for biasing the shaft so that the arm assumes an inoperative position and manual means for rotating said shaft and arm.

4. An electric motor comprising a field magnet, a rotor therefor, a supporting plate associated with the field magnet, plates carried by the supporting plate and insulated therefrom and from each other, said plates being in the circuit of the field magnet and one of said plates having a projecting contact merging into an inclined portion and a seat, and a rotary starter having an arm for successively engaging said contact, inclined portion and seat to complete the circuit to the ground.

5. An electric motor comprising a field magnet, a rotor therefor, a shaft for the rotor, and a starter for completing the circuit of the field magnet, said starter comprising a shaft having its axis substantially coincident with the axis of the rotor shaft and a conductive member carried by the starter shaft.

6. An electric motor comprising a field magnet, a rotor therefor, a shaft for the rotor, and a starter for the motor, said starter comprising a shaft having its axis substantially coincident with the axis of the rotor shaft, pawls on the end of the starter shaft adapted to engage teeth on the rotor shaft when the starter shaft is rotated.

7. An electric motor comprising a field magnet, a rotor therefor, a shaft for the rotor, and a starter for the motor, said starter comprising a shaft having its axis substantially coincident with the axis of the rotor shaft, pawls on the end of the starter shaft adapted to engage teeth on the rotor shaft, a conductive member carried by the starter shaft for completing the circuit of the field magnet, and means for rotating the starter shaft.

8. A device of the class described comprising a casing, a field magnet within the casing, a rotor therefor, a wiper operating shaft extending through a side of the casing, and a gear train operatively connecting the rotor and wiper shaft, said gear train being supported on the field magnet and being disposed between the field magnet and the side of the casing through which the wiper shaft extends.

9. A device of the class described comprising a casing, a field magnet within the casing, a rotor therefor, a shaft for the rotor journaled in the body of the field magnet, a gear on the shaft, a wiper operating shaft extending through a side of the casing, and a gear train disposed between the field magnet and the side of the casing through which the wiper shaft extends and connecting the gear on the rotor shaft with the wiper shaft.

10. A device of the class described comprising a casing, a field magnet within the casing, a rotor therefor, a wiper operating shaft extending through a side of the casing, means disposed between the field magnet and the said side of the casing for communicating the motion of the rotor to the wiper shaft, and means for rendering said communicating means inoperative when the wiper shaft is subjected to excessive resistance.

In testimony whereof, I have signed my name to this specification this 28th day of September, 1926.

JAMES T. SIBLEY.